US010858109B2

(12) United States Patent
Hodgkinson

(10) Patent No.: US 10,858,109 B2
(45) Date of Patent: Dec. 8, 2020

(54) ENERGY ABSORBING DEVICE

(71) Applicant: Acro Aircraft Seating Limited, Crawley (GB)

(72) Inventor: Alex Hodgkinson, London (GB)

(73) Assignee: Acro Aircraft Seating Limited, Crawley (GB)

( * ) Notice: Subject to any disclaimer, the term of this patent is extended or adjusted under 35 U.S.C. 154(b) by 146 days.

(21) Appl. No.: 15/941,982

(22) Filed: Mar. 30, 2018

(65) Prior Publication Data

US 2018/0283483 A1 Oct. 4, 2018

(30) Foreign Application Priority Data

Mar. 31, 2017 (GB) .................................. 1705187.1

(51) Int. Cl.
| | |
|---|---|
| *B64D 11/06* | (2006.01) |
| *B60N 2/42* | (2006.01) |
| *B60N 2/427* | (2006.01) |
| *F16F 1/40* | (2006.01) |
| *F16F 1/44* | (2006.01) |

(52) U.S. Cl.
CPC ............ *B64D 11/0619* (2014.12); *B60N 2/42* (2013.01); *B60N 2/4214* (2013.01); *B60N 2/4228* (2013.01); *B60N 2/42745* (2013.01); *B64D 11/06* (2013.01); *F16F 1/40* (2013.01); *F16F 1/44* (2013.01); *F16F 2224/0225* (2013.01)

(58) Field of Classification Search
CPC .... B60N 2/42; B60N 2/4228; B60N 2/42745; B64D 11/0619; B64D 11/06; F16F 9/003; F16F 1/40; F16F 1/44; F16F 2224/0225

USPC ............... 297/216.13, 216.14, 248; 267/131, 267/141.1, 140.11, 168, 141.12, 136; 188/109
See application file for complete search history.

(56) References Cited

U.S. PATENT DOCUMENTS

| | | | |
|---|---|---|---|
| 2,401,748 A | 6/1946 | Dillon | |
| 3,468,582 A * | 9/1969 | Judd | .................... B64D 11/064 297/445.1 |
| 3,567,281 A * | 3/1971 | Barecki et al. | ........ A47C 7/566 297/333 |

(Continued)

FOREIGN PATENT DOCUMENTS

| | | |
|---|---|---|
| DE | 19647649 A1 | 5/1998 |
| EP | 0 089 744 A2 | 9/1983 |

(Continued)

OTHER PUBLICATIONS

Extended European Search Report dated Jun. 14, 2018, for corresponding patent application No. EP 18 16 4530, 9 pp.

(Continued)

*Primary Examiner* — Milton Nelson, Jr.
(74) *Attorney, Agent, or Firm* — Klarquist Sparkman, LLP

(57) ABSTRACT

An energy absorbing device includes a first connector and a second connector. The first connector is for connection to the base of a seat back of an aircraft seat and the second connector is for connection to the frame of an aircraft seat. The first connector is moveable relative to the second connector. The energy absorbing device further includes one or more resiliently deformable members which are compressed when the first connector is moved away from the second connector. Also described is a seat comprising the energy absorbing device and a row of seats.

17 Claims, 4 Drawing Sheets

(56) References Cited

U.S. PATENT DOCUMENTS

| | | | | |
|---|---|---|---|---|
| 3,929,729 | A | * | 12/1975 | Chung ............... C08G 18/3863 267/138 |
| 5,454,622 | A | * | 10/1995 | Demopoulos ........ B60N 2/4221 188/374 |
| 5,482,261 | A | * | 1/1996 | Ortega ...................... F16F 3/06 267/166 |
| 5,657,950 | A | | 8/1997 | Han et al. |
| 5,927,804 | A | * | 7/1999 | Cuevas .................. B60N 2/888 297/216.12 |
| 6,050,637 | A | * | 4/2000 | Hangland ............ B60N 2/4228 297/216.14 |
| 6,416,126 | B1 | * | 7/2002 | Hangland ............ B60N 2/4214 297/216.13 |
| 6,416,127 | B1 | * | 7/2002 | Galbreath, Jr. ...... B60N 2/4214 297/216.13 |
| 6,942,295 | B1 | * | 9/2005 | Lopez .................... A47C 1/024 267/141.1 |
| 8,991,569 | B1 | | 3/2015 | Lou et al. |
| 10,259,583 | B2 | * | 4/2019 | Schmeer ............ B64D 11/0619 |
| 2010/0294886 | A1 | | 11/2010 | Baumann |

FOREIGN PATENT DOCUMENTS

| | | |
|---|---|---|
| EP | 2610178 A2 | 7/2013 |
| GB | 1228657 A | 4/1971 |
| WO | WO 98/15425 A1 | 4/1998 |
| WO | WO 01/56830 A1 | 8/2001 |
| WO | WO 2016/204667 A1 | 12/2016 |
| WO | WO 2017/044169 A1 | 3/2017 |

OTHER PUBLICATIONS

Combined Search and Examination Report issued by the UL Intellectual Property Office dated Sep. 28, 2017, for corresponding UK Patent Application No. GB1705187.1, 6 pp.

* cited by examiner

ENERGY ABSORBING DEVICE

CROSS REFERENCE TO RELATED APPLICATION

This application claims priority to United Kingdom Patent Application No. GB1705187.1, filed on Mar. 31, 2017, which is incorporated herein by reference in its entirety.

TECHNICAL FIELD

The present disclosure relates to energy absorbing devices, in particular to those for absorbing force and/or impact for use in aircraft seats.

BACKGROUND ART

In order to minimise injury to passengers in the event of a crash, aircraft seats are subjected to various tests. One such test is known as the "HIC" test or "head injury criterion" test, which measures the likelihood of head injury arising from an impact.

In the case of an aircraft seat, the use of a HIC test is used to measure the likelihood of head injury from the impact of a passenger hitting a seat back from behind; i.e. a seat back in front of the passenger. As will be appreciated, there is a significant risk of head injury in such an impact and so, in order to meet the requirements, aircraft seats are often provided with an energy absorbing device, also known as a dampening means.

Whilst energy absorbing devices are known, they suffer from various drawbacks. For example, it is known to provide "weak links", which will break at a defined impact. Whilst such a solution will cause a seat back to absorb an impact from behind, it means that the seat must then be repaired before it can be used again. It also means that the seat back will remain in a "folded forward" position after impact which can significantly hinder egress of passengers from the aircraft as they try and move past the broken seat back.

Further, the use of known systems can result in unintentional damage to a seat during maintenance, or during unexpected passenger activity, for example if a passenger falls against a seat back.

It is, therefore, an object of the present disclosure to seek to alleviate the above identified problems.

SUMMARY

According to one aspect of the disclosed technology, there is provided an energy absorbing device comprising a first connector and a second connector, wherein the first connector is for connection to the base of a seat back of an aircraft seat and the second connector is for connection to the frame of an aircraft seat, wherein the first connector is moveable relative to the second connector, wherein the energy absorbing device further comprises one or more resiliently deformable members, which are compressed when the first connector is moved away from the second connector.

The disclosed technology provides a remarkably effective energy absorbing device for an aircraft seat. The disclosed technology is intended for use with a seat back which is pivotally supported about side pivot points such that when the head of the seat back moves in a forward direction, the base of the seat back moves in a rearward direction. Such movement is typical in the event of an impact from behind the seat, for example if a passenger sitting in the seat behind is thrown forward in the event of a crash such that their head hits the upper part of the seat back. When the first connector of the energy absorbing device is connected to the base of the seat back and the second connector is connected to the frame of the aircraft seat at a position forward of the first connector, forward movement of the upper part of the seat back causes rearward movement of the base of the seat back and thus also of the first connector. The position of the second connector is fixed by virtue of its connection to the frame and so the first connector moves away from the second connector and the one or more resiliently deformable members are compressed. Compression of the one or more resiliently deformable members dampens the impact to reduce forward movement of the seat back minimising injury to both a passenger seated behind the seat back and a passenger seated in a seat of the seat back.

As a result of the use of one or more resiliently deformable members, the seat back will automatically return to its neutral position after a head impact. This removes the danger of a broken forward seat back causing an obstruction in the event of evacuation from an aircraft.

The disclosed technology also avoids other problems associated with known devices which rely on "weak links" to break at a defined impact. Not only do these require replacement, but it is notoriously difficult to calculate the exact load at which they will break. This is also a problem with "friction devices" for which small changes to part thicknesses and surface finishes cause huge changes in overall break-over force. In contrast, the one or more resiliently deformable members of the present invention have been found to be particularly consistent.

In addition to the above, the general "in-service" load cycles which are applied to the one or more resiliently deformable members are well below their allowable limits and cycles. This means that there is a low risk of the one or more resiliently deformable members wearing out. In contrast, known devices often diminish after a low number of potential service cycles. This reduces their effectiveness and makes them more liable to being continually broken-over in service, or worse still, breaking altogether, as has been seen with bend straps. The present invention does not suffer from any of these disadvantages. Nevertheless, in the unlikely event that the one or more resiliently deformable members do require replacement, this is very easily attended to.

Preferably, the energy absorbing device comprises a first part and a second part, the first part being moveable relative to the second part, wherein the first connector is provided on the first part and the second connector is provided on the second part.

Preferably, the first part comprises a first abutment member and the second part comprises a second abutment member, wherein the first abutment member abuts one end of the one or more resiliently deformable members and the second abutment member abuts an opposing end of the one or more resiliently deformable members. As will be appreciated, when the first connector moves away from the second connector, the one or more resiliently deformable members are compressed between the first and second abutment members.

Preferably, the first abutment member abuts a forward facing end of the one or more resiliently deformable members and the second abutment member abuts a rearward facing end of the one or more resiliently deformable members.

Preferably, the first and/or second abutment members comprise a plate, preferably a disc, or a ring.

Preferably, the first and/or second abutment members comprise a recess for receiving an end of a resiliently deformable member.

Preferably, the recess is bordered by a wall for holding a resiliently deformable member within the recess.

Preferably, the wall is an annular wall around the recess.

Preferably, the first part comprises an elongate member.

Preferably, the elongate member comprises a rod or a bar.

Preferably, the first connector is positioned at or near a first end of the first part and the first abutment member is positioned at or near an opposing second end of the first part.

Preferably, the second part comprises a holding means for holding the first part.

Preferably, the holding means is positioned around the first part.

Preferably, the holding means comprises a ring or disc positioned around the first part.

Preferably, the first part is moveable through the holding means.

Preferably, the holding means comprises the second abutment member.

Preferably, the first connector is positioned at or near a first end of the first part, the first abutment member is positioned at or near an opposing second end of the first part, the holding means comprises the second abutment member and the one or more resiliently deformable members are positioned between the holding means and the first abutment member.

Preferably, the first part is pivotable relative to the second part.

Preferably, the holding means is pivotally connected to the second part.

Preferably, the holding means is connected to the second part by a hinge.

Pivotable movement of the first part is particularly advantageous because it allows for the provision of the seat back in different recline positions. For example, this allows one seat to be provided with a different pre-set angle of seat back recline to another seat. Alternatively, or in addition, the energy absorbing device can include a recline mechanism and so pivotable movement of the first part allows for movement of the first connector with the base of the seat back as it moves forward/upward and rearward/downward.

Preferably, the energy absorbing device comprises a recline mechanism.

Preferably, the recline mechanism comprises a hydraulic piston and cylinder assembly.

Preferably, the recline mechanism comprises a hydraulic locking device, for example a hydraulic seat recline device, such as a Hydrolok® hydraulic seat recline device.

Preferably, the recline mechanism is positioned between the first connector and the second abutment member.

Preferably, the energy absorbing device comprises a tensioning means for compressing the one or more resiliently deformable members.

The provision of a tensioning means allows the seat back to be provided in a secure and solid position without any unnecessary movement from the energy absorbing device.

Preferably, the tensioning means comprises a nut rotatable about a screw thread on the first part for decreasing the distance between the first and second abutment members.

Preferably, the tensioning means is tightened to reduce the length of the one or more resiliently deformable members.

Preferably, the tensioning means is tightened to reduce the length of the one or more resiliently deformable members by between about 5% and about 25%, preferably by between about 5% and about 15%, preferably by about 10%. For example, in embodiments wherein a pair of resiliently deformable members are provided, each of a length of about 35 mm, the tensioning means is adjusted so that the length of each resiliently deformable member is reduced to about 32 mm, preferably about 31.5 mm.

Whilst specific examples for the dimensions of the resiliently deformable members have been presented herein, it will be appreciated that the specific dimensions, for example in the uncompressed and compressed states, are determined to suit the particular application.

Preferably, the one or more resiliently deformable members are positioned between the first and second abutment members.

Preferably, the one or more resiliently deformable members are positioned around the first part.

Preferably, the one or more resiliently deformable members comprise one or more cylindrical members.

Preferably, the one or more resiliently deformable members comprises one or more bushes.

Preferably, the one or more resiliently deformable members comprise a polymer material, preferably polyurethane.

Preferably, the one or more resiliently deformable members comprise one or more polyurethane bushes.

Preferably, the one or more resiliently deformable members comprise a centrally-positioned, inner, longitudinal channel for receiving an elongate member of the first part. That is, the one or more resiliently deformable members comprise an aperture via which it can be placed over and along the elongate member.

Preferably, in an uncompressed state, the aperture/longitudinal channel is between about 11 mm and about 16 mm in diameter. Preferably, the aperture/longitudinal channel is about 13.5 mm in diameter.

Preferably, the energy absorbing device comprises at least two resiliently deformable members. Accordingly, in a particularly preferred embodiment of the disclosed technology, the energy absorbing device comprises at least two, preferably two, polyurethane bushes.

Preferably, the energy absorbing device comprises at least two resiliently deformable members, wherein each resiliently deformable member is separated by a joining member, preferably wherein the joining member is a plate, preferably a rigid plate, preferably a metal plate.

Preferably, the joining member is a disc or ring.

Preferably, the joining member comprises one or more recesses for receiving an end of one or more resiliently deformable members.

Preferably, the joining member comprises a recess on opposing sides thereof.

Preferably, the one or more recesses are bordered by a wall for holding a resiliently deformable member within the recess.

Preferably, the wall is an annular wall around the recess.

Preferably, the energy absorbing device comprises a pair of resiliently deformable members, preferably a pair of polyurethane bushes, wherein, in an uncompressed state, each resiliently deformable member is between about 30 mm and about 40 mm in length and between about 28 mm and about 36 mm in diameter.

Preferably, the energy absorbing device comprises a pair of resiliently deformable members, preferably a pair of polyurethane bushes, wherein, in an uncompressed state, each resiliently deformable member is between about 33 mm and about 37 mm in length and between about 30 mm and about 34 mm in diameter.

Preferably, the energy absorbing device comprises a pair of resiliently deformable members, preferably a pair of polyurethane bushes, wherein, in an uncompressed state, each resiliently deformable member is about 35 mm in length and about 32 mm in diameter.

Preferably, the energy absorbing device comprises a sleeve positioned around the elongate member of the first part and between said elongate member and the one or more resiliently deformable members. This is particularly advantageous because it not only provides a guide for movement of the elongate member through the one or more resiliently deformable members and the second abutment member, but also allows for smooth movement of the elongate member in embodiments wherein the elongate member comprises a screw thread.

According to another aspect of the present invention, there is provided a seat, preferably a vehicle seat, preferably an aircraft seat, comprising one or more energy absorbing devices as described herein.

According to another aspect of the present invention, there is provided a row of seats as described herein.

Within this specification embodiments have been described in a way which enables a clear and concise specification to be written, but it is intended and will be appreciated that embodiments may be variously combined or separated. For example, it will be appreciated that all preferred features described herein are applicable to all aspects of the technology described herein and vice versa.

Within this specification, the term "about" means plus or minus 20%, more preferably plus or minus 10%, even more preferably plus or minus 5%, most preferably plus or minus 2%.

It will be appreciated that reference to "one or more" includes reference to "a plurality".

As noted above, whilst specific examples for the dimensions of the resiliently deformable members have been presented herein, it will be appreciated that the specific dimensions are determined to suit the particular application.

BRIEF DESCRIPTION OF THE DRAWINGS

Example embodiments of the disclosed technology will now be described with reference to the accompanying Figures, in which.

DETAILED DESCRIPTION

The present application relates to an energy absorbing device for use in a seat, preferably a vehicle seat, most preferably an aircraft seat, in particular to a head injury criterion (HIC) device.

Figure 1:
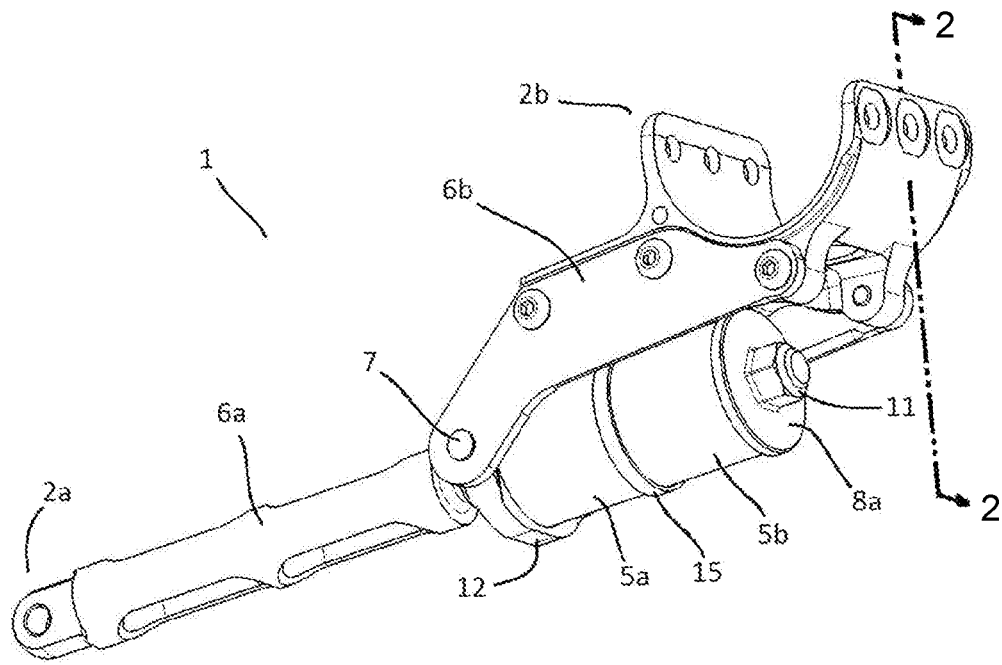
FIGS. 1 and 2 show external and cross-sectional views of an energy absorbing device of the present disclosure.
Figure 2:
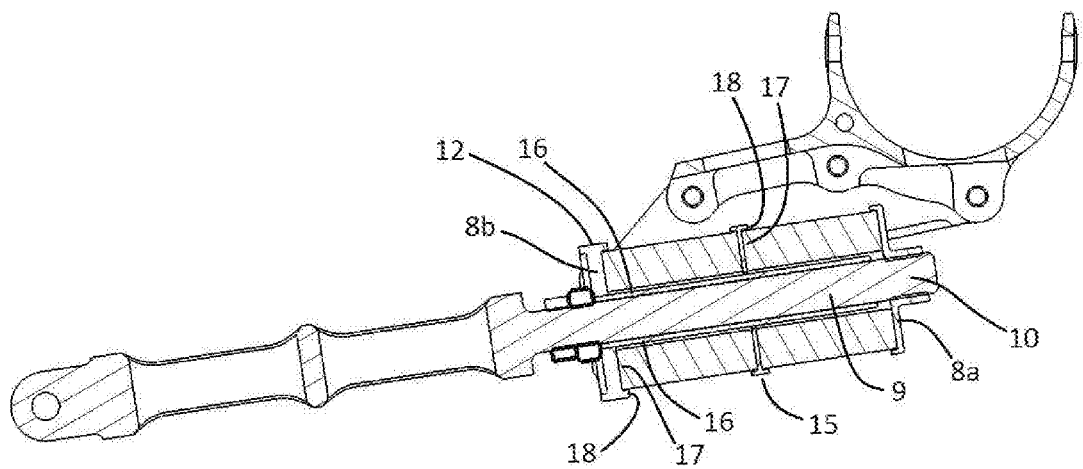
Figure 5:
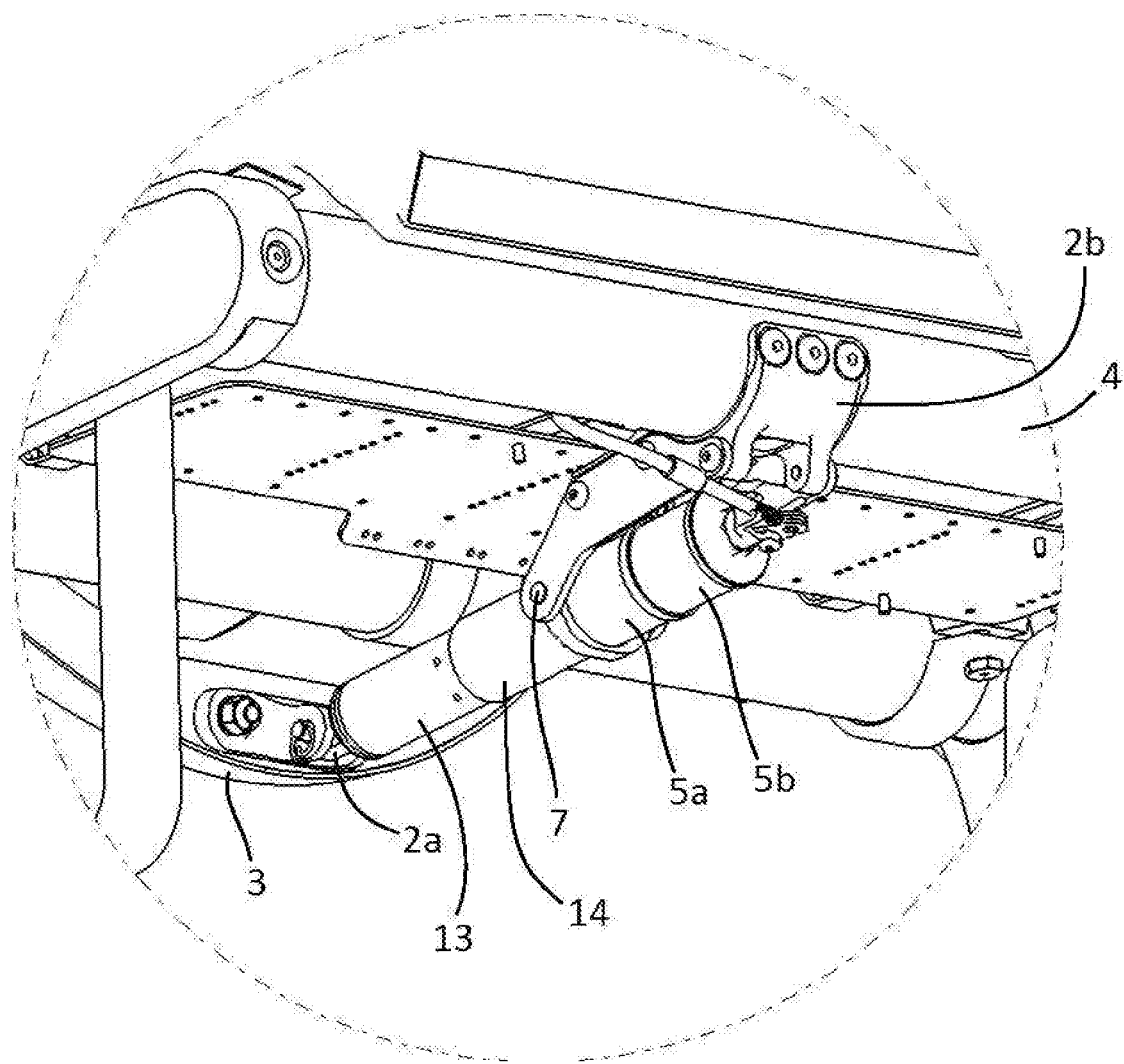
FIG. 5 shows the energy absorbing device of FIGS. 3 and 4 attached to the underside of an aircraft seat.

With reference to FIGS. 1 and 2, an energy absorbing device 1 comprises a first connector 2a and a second connector 2b. With reference to FIG. 5, the first connector 2a is for connection to the base of a seat back 3 of an aircraft seat and the second connector 2b is for connection to the frame 4 of an aircraft seat.

The first connector 2a is moveable relative to the second connector 2b. When the first connector 2a is moved away from the second connector 2b, a pair of resiliently deformable members 5a, 5b are compressed.

As noted elsewhere herein, the energy absorbing device 1 is intended for use with a seat back 3 which is pivotally supported about side pivot points (not shown), such that when the head of the seat back 3 moves in a forward direction, the base of the seat back 3 moves in a rearward direction. Such movement is typical in the event of an impact from behind the seat; for example, if a passenger sitting in the seat behind is thrown forward in the event of a crash such that their head hits the upper part of the seat back 3 in front of them. When the first connector 2a is connected to the base of the seat back 3 and the second connector 3b is connected to the frame 4 of the aircraft seat at a position forward of the first connector 2a, forward movement of the upper part of the seat back 3 causes rearward movement of the base of the seat back 3 and thus also of the first connector 2a. The position of the second connector 2b is fixed by virtue of its connection to the frame 4 and so the first connector 2a moves away from the second connector 2b and the pair of deformable members 5a, 5b are compressed. Compression of the deformable members 5a, 5b dampens the force of the impact and restricts forward movement of the upper part of seat back 3 minimising injury to both a passenger seated behind the seat back 3 and a passenger seated in a seat of the seat back 3.

The energy absorbing device 1 comprises a first part 6a which includes the first connector 2a and a second part 6b which includes the second connector 2b. The first part 6a is moveable relative to the second part 6b about a hinge 7.

The first part 6a includes a first abutment member 8a and the second part 6b includes a second abutment member 8b. The first abutment member 8a abuts one end of the second resiliently deformable member 5b and the second abutment member 8b abuts an opposing end of the first resiliently deformable member 5a. As such, when the first connector 2a moves away from the second connector 2b, the resiliently deformable members 5a, 5b are compressed between the first 8a and second 8b abutment members.

Taking into account the orientation of the seat and the resiliently deformable members 5a, 5b, it will be appreciated that the first abutment member 8a abuts a forward facing end of the resiliently deformable member 5b and the second abutment member 8b abuts a rearward facing end of the resiliently deformable member 5a.

Figure 6A:
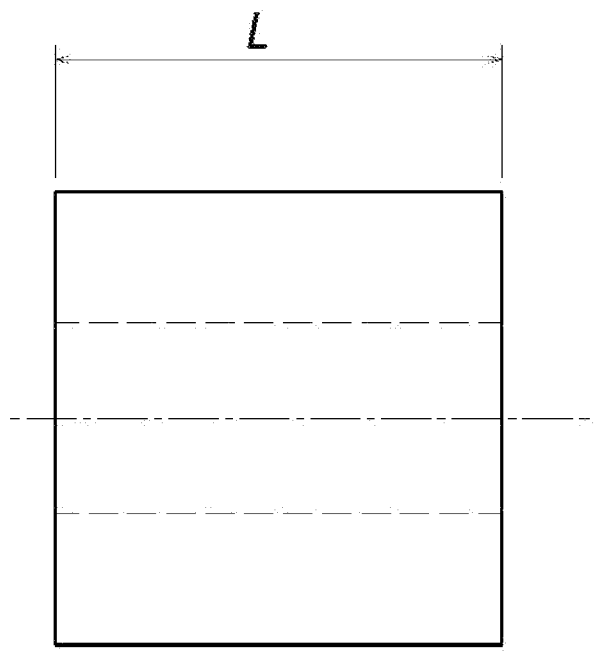
FIGS. 6A and 6B show side and end views of a resiliently deformable member.
Figure 6B:
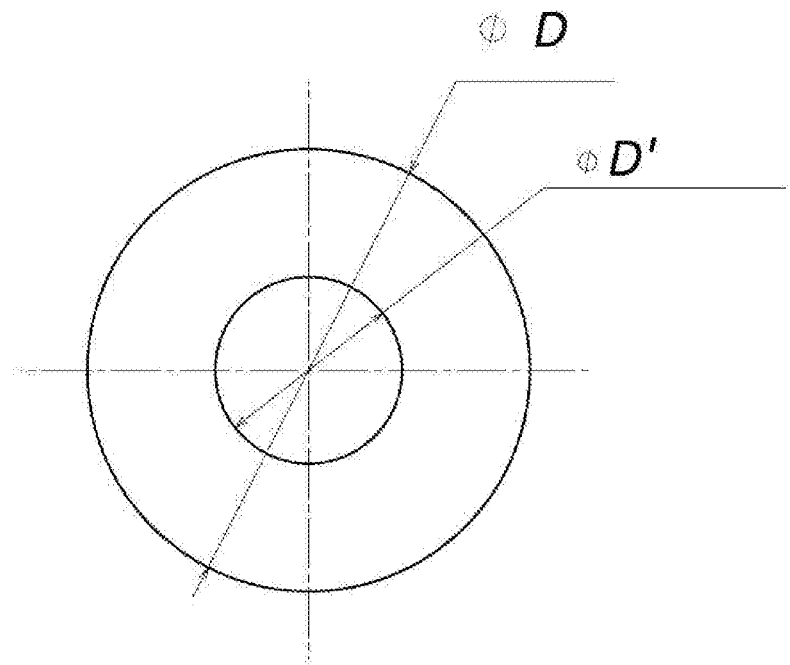

In the example shown, the first 8a and second 8b abutment members are discs provided with a central aperture through which an elongate member 9 of the first part 6a passes. The elongate member 9 includes a screw thread 10 and a nut 11 provided at one end of the screw thread 10. The nut 11 provides a tensioning means for partially compressing the resiliently deformable members 5a, 5b between the abutment members 8a and 8b. In use, the nut 11 is tightened against the first abutment member 8a such that the deformable members 5a, 5b are compressed to about 10% of their length. In the example shown, and with particular reference to FIG. 6A, the length L of each resiliently deformable member 5a, 5b is 35 mm±0.2 mm before installation. Once pre-tensioned, the length of each member 5a, 5b is reduced to about 31.5 mm±0.2 mm. With reference to FIG. 6B, the pre-installation diameter D of each resiliently deformable member 5a, 5b is 32 mm±0.2 mm and the pre-installation diameter D' of the central aperture is 13.5 mm±0.2 mm.

As noted above, whilst specific examples for the dimensions of the resiliently deformable members have been presented herein, it will be appreciated that the specific dimensions are determined to suit the particular application.

As shown in FIG. 1, the second part 6b includes a holding means 12 for holding the first part 6a. In the example shown, the holding means 12 comprises a ring positioned around the first part 6a and the first part 6a is moveable through the holding means 12. Also in the example shown, the holding means 12 comprises the disc/ring which forms the second abutment member 8b. The holding means 12 is pivotable about the hinge 7 to allow for pivotable movement of the first part 6a relative to the fixed second part 6b.

Pivotable movement of the first part 6a is particularly advantageous because it allows for the provision of the seat back 3 in different recline positions. For example, this allows one seat to be provided with a different pre-set angle of seat back 3 recline to another seat. Alternatively, or in addition, and as shown with reference to FIGS. 3 to 5 the energy absorbing device 1 can include a recline mechanism 13 and so pivotable movement of the first part 6a allows for movement of the first connector 2a with the base of the seat back 3 as it moves forward/upward during recline of the seat back 3 and rearward/downward during straightening of the seat back 3.

Figure 3:
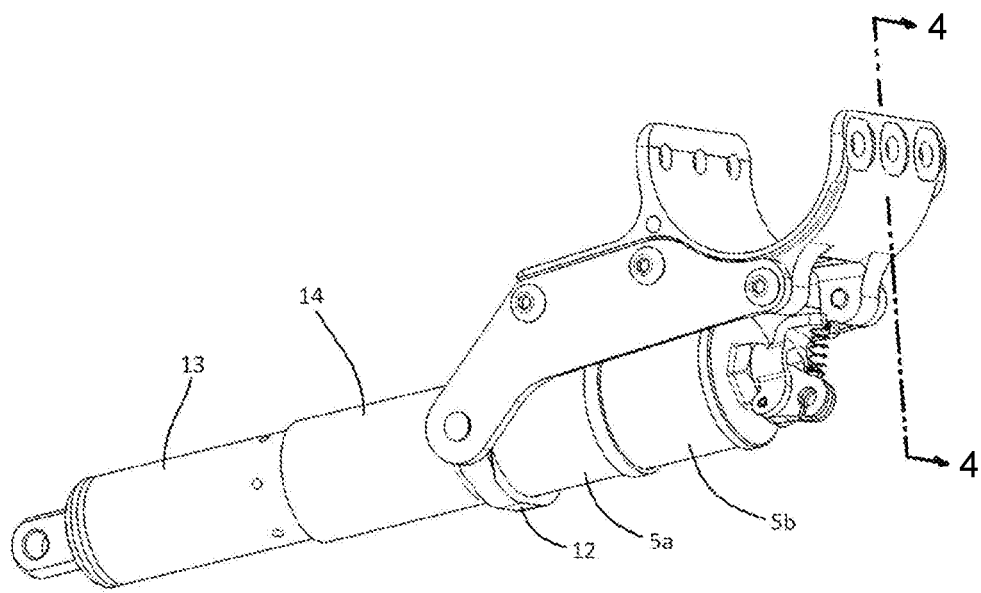
FIGS. 3 and 4 show external and cross-sectional views of an energy absorbing device which includes a recline mechanism.
Figure 4:
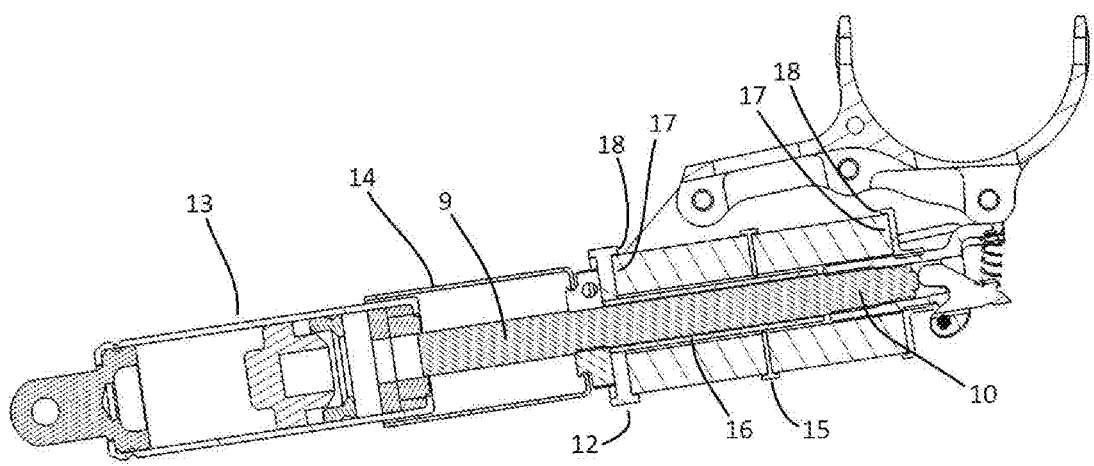

With further reference to FIGS. 3 to 5, a recline mechanism includes a hydraulic piston and cylinder assembly 13, such as a Hydrolok® hydraulic seat recline device, provided on the first part 6a adjacent the first connector 2a. The elongate member 9 extends from the forward facing end of the hydraulic piston and cylinder assembly 13 through the holding means 12 and second abutment member 8b and through the resiliently deformable members 5a, 5b, with the first abutment member 8a and tensioning nut 11 provided at its forward facing end.

A cover 14 is provided around the elongate member 9 between the hydraulic piston and cylinder assembly 13 and holding means 12.

As shown in the Figures, each resiliently deformable member 5a, 5b is a cylindrical polyurethane bush. It has been found that if a single resiliently deformable member is provided at a length corresponding to the pair of resiliently deformable members, it bows under compression. However, it has been found that this is prevented by the use of a pair of separate, resiliently deformable members 5a, 5b, with a joining member (metal ring) 15, provided therebetween.

Whilst the polyurethane has been found to be particularly well suited, it will be appreciated that other suitable materials could be used for the resiliently deformable members.

With particular reference to FIGS. 2 and 4, the abutment members 8a, 8b and joining member 15 include recesses 17 bordered by a wall 18 for holding the resiliently deformable members 5a, 5b in the correct position.

As shown in FIGS. 2 and 4, a sleeve 16 is positioned between the screw thread 10 of said elongate member 9 and the resiliently deformable members 5a, 5b.

This not only provides a guide for movement of the elongate member 9 through the resiliently deformable members 5a, 5b and the second abutment member 8b, but also prevents snagging on the screw thread 10 and so allows for smooth movement of the elongate member 9 through the resiliently deformable members 5a, 5b.

It should be understood that various changes and modifications to the embodiments described herein will be apparent to those skilled in the art. Such changes and modifications can be made without departing from the spirit and scope of the disclosure and without diminishing its attendant advantages. It is therefore intended that such changes and modifications are covered by the appended claims.

The invention claimed is:

1. A vehicle seat comprising a seat frame, a seat back and an energy absorbing device, wherein the energy absorbing device comprising a first connector and a second connector, wherein the first connector is configured for connection to the base of the seat back and the second connector is configured for connection to the frame, wherein the first connector is moveable relative to the second connector, wherein the energy absorbing device further comprises at least two resiliently deformable members, which are compressed when the first connector is moved away from the second connector, wherein the at least two resiliently deformable members comprise a polymer material and are separated by a joining member.

2. The vehicle seat according to claim 1, comprising a first part and a second part, the first part being moveable relative to the second part, wherein the first connector is provided on the first part and the second connector is provided on the second part.

3. The vehicle seat according to claim 2, wherein the first part comprises an elongate member.

4. The vehicle seat according to claim 3, comprising a sleeve positioned around the elongate member of the first part and between said elongate member and the at least two resiliently deformable members.

5. The vehicle seat according to claim 2, wherein the first part is pivotable relative to the second part.

6. The vehicle seat according to claim 2, wherein the second part comprises a holding means for holding the first part.

7. The vehicle seat according to claim 6, wherein the holding means is positioned around the first part.

8. The vehicle seat according to claim 6, wherein the first part is moveable through the holding means.

9. The vehicle seat according to claim 6, wherein the holding means is pivotally connected to the second part.

10. The vehicle seat according to claim 6, wherein the first part comprises a first abutment member and the second part comprises a second abutment member and wherein the holding means comprises the second abutment member and wherein the first connector is positioned at or near a first end of the first part, the first abutment member is positioned at or near an opposing second end of the first part, the holding means comprises the second abutment member and the at least two resiliently deformable members are positioned between the holding means and the first abutment member.

11. The vehicle seat according to claim 2, wherein the first part comprises a first abutment member and the second part comprises a second abutment member, wherein the first abutment member abuts one end of the at least two resiliently deformable members and the second abutment member abuts an opposing end of the at least two resiliently deformable members.

12. The vehicle seat according to claim 11, wherein the first connector is positioned at or near a first end of the first part and the first abutment member is positioned at or near an opposing second end of the first part.

13. The vehicle seat according to claim 11, wherein the first abutment member abuts a forward facing end of the at least two resiliently deformable members and the second abutment member abuts a rearward facing end of the at least two resiliently deformable members.

14. The vehicle seat according to claim 2, wherein the at least two resiliently deformable members are positioned around the first part.

15. The vehicle seat according to claim 1, comprising a tensioning means for compressing the at least two resiliently deformable members.

16. The vehicle seat according to claim 1, comprising a recline mechanism.

17. A row of vehicle seats according to claim 1.

* * * * *